US012624169B2

(12) United States Patent
Li et al.

(10) Patent No.: US 12,624,169 B2
(45) Date of Patent: May 12, 2026

(54) FILLED SILICONE COMPOSITION CONTAINING SUCCINIC ANHYDRIDE FUNCTIONAL SILOXANE THIXOTROPIC AGENTS

(71) Applicants: Dow Silicones Corporation, Midland, MI (US); Dow Global Technologies LLC, Midland, MI (US)

(72) Inventors: Zhanjie Li, Midland, MI (US); Kyle McDonald, Midland, MI (US); Andrés E. Becerra, Midland, MI (US); Joseph Sootsman, Auburn, MI (US); Chi-Hao Chang, Midland, MI (US); Darren Hansen, Auburn, MI (US); Dongchan Ahn, Midland, MI (US); Richard Cooper, Schwenksville, PA (US)

(73) Assignees: Dow Silicones Corporation, Midland, MI (US); Dow Global Technologies LLC, Midland, MI (US)

( * ) Notice: Subject to any disclaimer, the term of this patent is extended or adjusted under 35 U.S.C. 154(b) by 399 days.

(21) Appl. No.: 18/251,420

(22) PCT Filed: Jan. 13, 2022

(86) PCT No.: PCT/US2022/012245

§ 371 (c)(1),
(2) Date: May 2, 2023

(87) PCT Pub. No.: WO2022/164640

PCT Pub. Date: Aug. 4, 2022

(65) Prior Publication Data

US 2024/0010797 A1 Jan. 11, 2024

Related U.S. Application Data

(60) Provisional application No. 63/142,014, filed on Jan. 27, 2021.

(51) Int. Cl.

| | |
|---|---|
| ***C08G 77/38*** | (2006.01) |
| ***C08G 77/08*** | (2006.01) |
| ***C08G 77/12*** | (2006.01) |
| ***C08G 77/20*** | (2006.01) |
| ***C08K 3/22*** | (2006.01) |
| ***C08K 9/06*** | (2006.01) |

(52) U.S. Cl.

CPC ............. *C08G 77/38* (2013.01); *C08G 77/08* (2013.01); *C08G 77/12* (2013.01); *C08G 77/20* (2013.01); *C08K 3/22* (2013.01); *C08K 9/06* (2013.01); *C08K 2003/2227* (2013.01); *C08K 2003/2296* (2013.01); *C08K 2201/001* (2013.01); *C08K 2201/005* (2013.01); *C08K 2201/014* (2013.01)

(58) Field of Classification Search

CPC ........ C08G 77/38; C08G 77/08; C08G 77/12; C08G 77/20; C08G 77/14; C08K 3/22; C08K 9/06; C08K 2003/2227; C08K 2003/2296; C08K 2201/001; C08K 2201/005; C08K 2201/014; C08L 83/04; C08L 83/06

See application file for complete search history.

(56) References Cited

U.S. PATENT DOCUMENTS

| | | | | |
|---|---|---|---|---|
| 5,221,339 | A | 6/1993 | Takahashi et al. | |
| 9,593,275 | B2 * | 3/2017 | Tang | C09J 183/06 |
| 2005/0020738 | A1 | 1/2005 | Jackson et al. | |
| 2021/0277243 | A1 * | 9/2021 | Eckberg | B05D 3/0272 |

FOREIGN PATENT DOCUMENTS

| | | | |
|---|---|---|---|
| CN | 103709757 | 4/2014 | |
| CN | 104673190 | 6/2015 | |
| JP | 4412578 | 2/2010 | |
| JP | 2014015557 | 1/2014 | |
| JP | 2019001875 | 1/2019 | |
| WO | 2003068154 | 8/2003 | |
| WO | WO-2020053357 A1 * | 3/2020 | C08K 5/1539 |

OTHER PUBLICATIONS

Arkles, "Reactive Silicones: Forging New Polymer Links", Gelest, 2016, Ver. 6.

Liu, "Effect of thixotropic agent on the properties of conductive silicone rubber gasket for EMI shielding", Advanced Materials Research, 2011, vols. 239-242, pp. 3350-3353.

* cited by examiner

*Primary Examiner* — Robert S Jones, Jr.
*Assistant Examiner* — Joshua Caleb Bledsoe
(74) *Attorney, Agent, or Firm* — Steven W. Mork

(57) ABSTRACT

A composition contains filler particles dispersed in a matrix material, wherein the matrix material includes: (a) a first polyorganosiloxane that comprises an average of 2 or more succinic anhydride groups per molecule; and (b) a second polyorganosiloxane other than the first polyorganosiloxane; wherein the filler particles are present at a concentration in a range of 15 to 80 volume-percent based on composition volume and wherein the first polyorganosiloxane is present at a concentration sufficient to provide succinic anhydride groups at a concentration of 0.30 to 200 micromoles per gram of matrix material.

9 Claims, No Drawings

FILLED SILICONE COMPOSITION CONTAINING SUCCINIC ANHYDRIDE FUNCTIONAL SILOXANE THIXOTROPIC AGENTS

FIELD OF THE INVENTION

The present invention relates to filled silicone compositions that contain succinic anhydride terminated siloxane thixotropic agents.

INTRODUCTION

Filled silicone compositions comprise a filler dispersed in a matrix material that comprises a polysiloxane component. Filled silicone compositions are used in many applications including as conductive silicone compositions such as thermally conductive materials and electrically conductive materials. The filler in conductive silicone compositions helps increase the conductive character of the composition. Thermally conductive silicone compositions typically contain thermally conductive fillers and electrically conductive silicone compositions typically contain electrically conductive fillers. The fillers are often present at concentrations of 15 volume-percent (vol %) or more and can be present at concentrations up to 80 vol % based on filled silicone composition volume. Increasing the amount of conductive filler can increase the conductive characteristics of the silicone composition, but it also typically increases the filled silicone composition's viscosity, which can cause the silicone composition to be difficult to apply to substrates (low workability). As a result, there has been tension between maximizing conductive properties of a silicone composition versus maintaining workability of the silicone composition.

It is desirable to have high workability by having low viscosity under shear, but it is also often desirable to have high viscosity under low or no shear to maintain the shape and location (that is, physical stability) where it is placed. Shear thinning compositions have a relatively high viscosity under little or no shear to provide composition stability while demonstrating relatively lower viscosity under shear to allow extrusion. As a result, shear thinning compositions can readily be applied by relatively high shear methods such as extrusion yet maintain physical stability once applied. There are ways to introduce shear thinning character to a filled silicone composition. However, the challenge is identifying how to induce shear thinning behavior in a filled silicone composition while still achieving a low enough viscosity under shear so as to allow for extrusion of the composition. Many methods for increasing shear thinning character often result in reduced extrusion/flow under shear. Shear thinning behavior is often characterized by a composition's "thixotropic index", which is a ratio of the viscosity at a low shear condition divided by the viscosity at a high shear condition. Increasing the thixotropic index corresponds to increasing the shear thinning character of a composition.

The thixotropic index can be increased by increasing the low shear viscosity, decreasing the high shear viscosity, or a combination of these. It can be desirable, however, to preferentially increase the low shear viscosity relative to decreasing high shear viscosity. Increasing low shear viscosity enhances physical stability and compositional stability (settling of the filler out from the composition) once applied or when in storage. When those features are of primary importance, such as in vertical applications where the composition should not drip or sag, it is desirable to increase low shear viscosity as much as possible. Changing high shear viscosity up or down can impact the method of deposition or extrusion of the composition in undesirable ways so it can be desirable to minimize the change in high shear viscosity.

An objective of the present invention is to identify an additive for filled silicone compositions that preferentially increases the low shear viscosity of a filled silicone composition relative to its high shear viscosity in order to increase the thixotropic index of the filled silicone composition. More specifically, an object of the present invention is to identify an additive for filled silicone compositions comprising 15 to 80 vol % filler, based on filled silicone composition volume, that increases the thixotropic index of the composition while preferentially increasing the Maximum Viscosity relative to Minimum Viscosity of the composition and while achieving a Minimum Viscosity of 200 Pascal*seconds (Pa*s) or less as determined with a strain sweep method over a strain amplitude range of 0.01 percent (%) to 300% as described herein below. Even more desirable is if the additive can at the same time increase the thixotropic index of the filled silicone composition by 50% or more, preferably 75% or more, and most preferably 100% or more.

BRIEF SUMMARY OF THE INVENTION

The present invention provides a solution to the challenge of identifying an additive for filled silicone compositions that preferentially increases the low shear viscosity of a silicone composition relative to its high shear viscosity in order to increase the thixotropic index of the composition. The additive of the present invention serves as a thixotropic agent for filled silicone compositions comprising 15 to 80 vol % filler that increases the thixotropic index of the filled silicone composition while preferentially increasing the Maximum Viscosity relative to Minimum Viscosity of the filled silicone composition and while achieving a Minimum Viscosity of 200 Pascal*seconds (Pa*s) or less as determined with a strain sweep method over a strain amplitude range of 0.01 percent (%) to 300% as described herein below. The additive can at the same time increase the thixotropic index of the filed silicone composition by 50% or more, preferably 75% or more, and most preferably 100% or more.

The present invention is a result of discovering succinic anhydride functional linear polysiloxanes having on average two or more succinic anhydride groups per molecule can act as a thixotropic agent in filled silicone compositions to achieve objectives set forth above.

In a first aspect, the present invention is a composition comprising filler particles dispersed in a matrix material, wherein the matrix material comprises: (a) a first polyorganosiloxane that comprises an average of 2 or more succinic anhydride groups per molecule; and (b) a second polyorganosiloxane other than the first polyorganosiloxane; wherein the filler particles are present at a concentration in a range of 15 to 80 volume-percent based on composition volume and wherein the first polyorganosiloxane is present at a concentration sufficient to provide succinic anhydride groups at a concentration of 0.30 to 200 micromoles per gram of matrix material.

The composition of the present invention is useful as, for example, filled conductive polysiloxane compositions such as thermally conductive polysiloxane compositions and/or electrically conductive polysiloxane compositions.

DETAILED DESCRIPTION OF THE INVENTION

Test methods refer to the most recent test method as of the priority date of this document when a date is not indicated with the test method number. References to test methods contain both a reference to the testing society and the test method number. The following test method abbreviations and identifiers apply herein: ASTM refers to ASTM International methods; EN refers to European Norm; DIN refers to Deutsches Institut für Normung; ISO refers to International Organization for Standards; and UL refers to Underwriters Laboratory.

Products identified by their tradename refer to the compositions available under those tradenames on the priority date of this document.

"Multiple" means two or more. "And/or" means "and, or as an alternative". All ranges include endpoints unless otherwise indicated.

"Hydrocarbyl" refers to a univalent group formed by removing a hydrogen atom from a hydrocarbon and includes alkyl and aryl groups.

"Alkyl" refers to a hydrocarbon radical derivable from an alkane by removal of a hydrogen atom. An alkyl can be linear or branched.

"Aryl" refers to a radical formable by removing a hydrogen atom from an aromatic hydrocarbon.

"Maximum Viscosity", "Minimum Viscosity", and "Thixotropic Index" for a composition are determined according to the following oscillatory shear strain amplitude sweep ("Strain Sweep") method. Provide a pair of 25 millimeter (mm) diameter round parallel serrated plates (for example, part number 401978.901 from TA Instruments, New Castle, DE, USA). Dispose a sample composition onto one of the plates and press the other plate against the sample composition until the plates are parallel to one another with a gap spacing between them of 1.0 mm with the sample composition in thermal contact with both plates and filling the gap spacing between the plates. Using an ARES-G2 strain-controlled rheometer (TA Instruments, New Castle, DE, USA), conduct a logarithmic sweep of strain amplitude from 0.01 percent (%) to 300% on the sample composition with 20 sampling points per decade using an angular frequency of 10 radians per second at 23 degrees Celsius (° C.). Record Complex Viscosity in Pascal*seconds (Pa*s) as a function of Percent Oscillation Strain Amplitude. The "Maximum Viscosity" is the highest Complex Viscosity recorded above an oscillation torque amplitude of 0.1 microNewton*meter (or, equivalently, above an oscillation stress amplitude threshold of 0.0326 Pascals). The "Minimum Viscosity" is the lowest Complex Viscosity recorded above the same threshold.

"Thixotropic Index" is the ratio of the Maximum Viscosity to the Minimum Viscosity. The compositions of the present invention are able to achieve a Thixotropic Index of 2.5 or more, 2.7 or more, and some 3.0 or more, even 4.0 or more while at the same time achieving a Minimum Viscosity of 200 Pa*s or less, even 175 Pa*s or less, 150 Pa*s or less, 125 Pa*s or less or even 100 Pa*s or less.

Determine the composition and average number of siloxane units in a polysiloxane using $^{29}Si$, $^{13}C$, and $^{1}H$ nuclear magnetic resonance spectroscopy (see, e.g., *The Analytical Chemistry of Silicones*, Smith, A. Lee, ed., John Wiley & Sons: New York, 1991, p. 347 ff.).

The composition of the present invention comprises filler particles dispersed (distributed) in a matrix material. The matrix material comprises a first polyorganosiloxane and a second polyorganosiloxane.

The first polyorganosiloxane comprises an average of 2 or more succinic anhydride groups per molecule. Desirably, the first polyorganosiloxane is a linear polyorganosiloxane. Linear polyorganosiloxanes comprise primarily, and can be consist exclusively, of siloxane units selected from $R''_3SiO_{1/2}$ ("M") and $R''_2SiO_{2/2}$ ("D") siloxane units, where R" is a monovalent organic or substituted organic group attached to the silicon atom and the $O_{1/2}$ and $O_{2/2}$ of each siloxane unit refer to oxygen atoms shared with another silicon atom of another siloxane unit. Linear polyorganosiloxanes can contain 2 or fewer, preferably one or fewer $R''SiO_{3/2}$ ("T") and $SiO_{4/2}$ ("Q") siloxane units. Desirably, the first polyorganosiloxane has a succinic anhydride group on each end of a linear polyorganosiloxane.

The first polyorganosiloxane can have chemical structure (I):

(I)

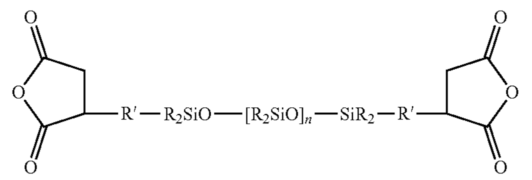

where:

- R' is independently in each occurrence selected from a group of divalent hydrocarbons having one or more, and can have 2 or more, 3 or more, 4 or more, even 5 or 25 more carbon atoms while at the same time typically has 6 or fewer, and can have 5 or fewer, 4 or fewer, 3 or fewer, even 2 or fewer carbon atoms. For example, R' can be $—CH_2CH_2CH_2—$ in one or all occurrences.
- R is independently in each occurrence selected from a group of hydrocarbyls having one or more, 2 or more, 3 or more, 4 or more, 5 or more, 6 or more, even 7 or more carbon atoms and at the same time typically has 8 or fewer, and can have 7 or fewer, 6 or fewer, 5 or fewer, 4 or fewer, 3 or fewer, even 2 or fewer carbon atoms. For example R can be selected from methyl and phenyl groups.
- Subscript n is the average number of $[R_2SiO]$ groups in the first polyorganosiloxane and has a value of 5 or more, and can have a value of 10 or more, 20 or more, 30 or more, 40 or more, 50 or more, 60 or more 70 or more 80 or more 90 or more even 100 or more while at the same time typically has a value of 150 or less, 140 or less, 130 or less, 120 or less, 110 or less, even 100 or less.

Include in the composition sufficient first polyorganosiloxane to provide a concentration of succinic anhydride groups that is 0.30 or more, and can be 0.40 or more, 0.50 or more, 1.0 or more, 5 or more, 10 or more, 25 or more, 50 or more, 75 or more, 100 or more, 125 or more, 150 or more, 175 or more, 200 or more, even 250 or more while at the same time is typically 300.0 or fewer, 290 or fewer, 275 or fewer, 250 or fewer, 225 or fewer, 200 or fewer, 175 or fewer, 150 or fewer, 125 or fewer, even 100 or fewer micromoles of succinic anhydride groups per gram of matrix material.

If the formulation used to make the composition is known, determine the concentration of succinic anhydride groups from the materials used to make the composition. In particular, determine the concentration of succinic anhydride group in the composition from the number average molecular weight (Mn) of the first polyorganosiloxane ($Mn_{(1st\ Siloxane)}$), the average number of succinic anhydride groups per molecule (#SAG), the weight-percent of first polyorganosiloxane in the composition (WT %1), and the weight-percent of matrix material (all components other than filler) in the composition (WT %2). Determine Mn by gel permeation chromatography using a polystyrene standard. Determine the #SAG by proton ($^1H$) nuclear magnetic resonance (NMR) spectroscopy. Determine the WT %1 value from the weight of first polyorganosiloxane used to prepare the composition and the composition weight. Determine the WT %2 value from the weight of matrix material in the composition and the composition weight. Calculate the concentration of succinic anhydride groups in micromoles succinic anhydride per gram of matrix material using equation (A):

$$\text{Concentration of Succinic Anhydride} = [(1{,}000{,}000)(\#SAG)(WT\ \%1)]/[(Mn_{(1st\ Siloxane)})(WT\ \%2)] \quad (A)$$

If the formulation used to make the composition is unknown, then the concentration of succinic anhydride groups can be determined from a composition by extracting the matrix material from the filler using a solvent. The solvent can then be removed and the matrix materials analyzed by quantitative Fourier Transform Infrared Spectroscopy (FTIR) to determine the number of moles of succinic anhydride groups in the matrix. Dividing that number by the mass of the matrix material provides the concentration of succinic anhydride groups in the matrix.

The matrix material further comprises a second polyorganosiloxane other than the first polyorganosiloxane. Desirably, the second polyorganosiloxane is free of succinic anhydride groups. Desirably, the second polyorganosiloxane is a vinyl functional polyorganosiloxane. The second polyorganosiloxane can be a linear polyorganosiloxane such as one having chemical structure (II):

$$R^aR_2SiO—[R_2SiO]_m—OR_2R_a \quad (II)$$

where:

R and $R^a$ are independently in each occurrence selected from hydrocarbyl groups, preferably having one or more and at the same time 8 or fewer, 6 or fewer, 4 or fewer, even 3 or fewer or 2 or fewer carbon atoms. Desirably, R is an alkyl group and $R^a$ is an alkenyl group such as a vinyl group. For example, each $R^a$ can be a vinyl group and each R can be selected from methyl or phenyl groups.

Subscript "m" is the average number of $R_2SiO$ units per molecule and generally is a value of 10 or more, 20 or more, 30 or more, even 40 or more and at the same time 1000 or less, 800 or less, 600 or less, 400 or less, 200 or less, 150 or less, 100 or less, 80 or less, 60 or less, even 50 or less or 45 or less.

The matrix material can comprise a third polyorganosiloxane different from the first and second polyorganosiloxanes. The third polyorganosiloxane can comprise two or more silicone hydride groups. For example, the matrix material can be a hydrosilylation curable composition comprising the first polyorganosiloxane, a second polyorganosiloxane having vinyl functionality (for example, chemical structure (II) where each $R^a$ is vinyl) and a third polyorganosiloxane that has multiple silyl hydride (SiH) groups.

The composition further comprises filler particles dispersed in the matrix material. The filler particles are present at a concentration of 15 volume-percent (vol %) or more, 20 vol % or more, 25 vol % or more, 30 vol % or more, 35 vol % or more, 40 vol % or more, 45 vol % or more, 50 vol % or more, 55 vol % or more, 60 vol % or more, 65 vol % or more, 70 vol % or more, even 75 vol % or more while at the same time are generally present at a concentration of 80 vol % or less, 75 vol % or less, 70 vol % or less, 65 vol % or less, 60 vol % or less, 55 vol % or less, 50 vol % or less, 45 vol % or less, 40 vol % or less, 35 vol % or less, even 30 vol % or less based on composition volume.

The filler particles can be thermally conductive fillers, electrically conductive fillers, non-conductive fillers, or any combination of these types of fillers. Desirably, the thermally conductive fillers are any one or any combination of more than one filler selected from thermally conductive fillers and electrically conductive fillers.

Thermally conductive fillers include metal particles such as particles of aluminum, silver and copper; metal coated particles including particles of any type coated with a metal such as aluminum, silver and copper; inorganic particles such as particles of boron nitride, aluminum oxide, zinc oxide, magnesium oxide, aluminum nitride, and aluminum trihydrate; as well as carbonaceous material such as carbon nanotubes, graphene, and carbon fibers.

Electrically conductive fillers include metal particles such as particles of silver, gold, platinum, palladium, nickel, copper and alloys thereof; particles of any kind coated with a metal such as silver, gold, platinum, palladium, nickel, copper and alloys thereof; as well as carbon black, carbon fibers, carbon nanotubes, and graphene.

The filler particles typically have an average particle size of 0.05 micrometers (μm) or more, 0.1 μm or more, 0.2 μm or more, 0.5 μm or more, 1.0 μm or more, 2.0 μm or more, 3.0 μm or more, 5.0 μm or more, 10 μm or more, 20 μm or more, 30 μm or more, 40 μm or more, 50 μm or more and can be 60 μm or more, 70 μm or more, 80 μm or more, 90 μm or more, even 100 μm or more while at the same time typically have an average particle size of 250 μm or less, 200 μm or less, 150 or less, 100 μm or less, 90 μm or less, 80 μm or less, 70 μm or less, 60 μm or less, 50 μm or less, 40 μm or less, 30 μm or less, 20 μm or less, 10 μm or less, 5.0 μm or less, even 3.0 μm or less, 1.0 μm or less. Determine average particle size as the volume-weighted median value of particle diameter distribution (Dv50) of the polyorganosiloxane using a Mastersizer™ 3000 laser diffraction particle size analyzer from Malvern Instruments.

In the broadest scope, the filler particles can be of any shape including any one or any combination of more than one of the following shapes: spherical, platelet, rod-like, or irregularly shaped (for example, "crushed").

The composition can, and typically does, comprise a combination of different types and/or sizes of filler particles. For instance, the composition can comprise a collection to two or more, even three or more different filler particles that differ in composition and/or shape and/or size.

The compositions of the present invention can further comprise or be free of any one or combination of additional components beyond those already discussed herein. For example, the composition can further comprise (or be free of) a filler treating agent as part of the matrix material. Filler treating agents are desirable to improve dispersion of the filler into the matrix material, typically by reducing filler agglomeration and filler-filler interactions. Filler treating agents can also improve wet-out of the filler surfaces by matrix material, reduce viscosity of the composition and cap reactive groups on filler surfaces to prevent reactions with the filler that may reduce shelf life of the composition. Desirably, the treating agent comprises, or consists of, one or both of an alkyltrialkoxysilane and monotrialkoxysiloxy-terminated diorganopolysiloxane.

Examples of suitable alkyltrialkoxysilanes have the general formula: $(R^1)(R^2O)_3Si$; where $R^1$ is an alkyl desirably having 6 or more, 7 or more, 8 or more, 9 or more, 10 or more, 11 or more, 12 or more, 13 or more, 14 or more, 15 or more, even 16 or more carbon atoms while at the same time typically has 18 or fewer and can have 17 or fewer, 16 or fewer, 15 or fewer, 14 or fewer, 13 or fewer, 12 or fewer, 11 or fewer or even 10 or fewer carbon atoms on average per molecule; and $R^2$ is desirably an alkyl having one or more, 2 or more, 3 or more, 4 or more, 5 or more, even 6 or more while at the same time typically contains 10 or fewer, 9 or fewer, 8 or fewer, 7 or fewer, 6 or fewer, 5 or fewer, 4 or fewer, 3 or fewer, even 2 or fewer carbon atoms. Desirably, the alkyltrialkoxysilane is an alkyltrimethoxy silane with the alkyl group as described above. One example of a desirable alkyl trialkoxy silane is n-decyltrimethoxy silane. The concentration of alkyltrialkoxysilane in the composition is generally zero wt % or more, 0.05 wt % or more, 0.10 wt % or more, 0.02 wt % or more, 0.22 wt % or more, 0.24 wt % or more while at the same time is generally 0.75 wt % or less, 0.50 wt % or less, 0.40 wt % or less, 0.30 wt % or less, preferably 0.28 wt % or less, 0.26 wt % or less 0.24 wt % or less and can be 0.22 wt % or less based on the composition weight.

Examples of suitable monotrialkoxysiloxy-terminated diorganopolysiloxanes generally have the following chemical structure (III):

$$R_3SiO—(R_2SiO)_h—[(CH_2)_e((CH_3)_2SiO)_f]_g—(CH_2)_e—Si(OR^2)_3 \quad (III)$$

where: R and $R^2$ are each independently in each occurrence as defined above; subscript h is the average number of $(R_2SiO)$ units per molecule and typically has a value of 10 or more, 15 or more, 20 or more, 25 or more, even 30 or more while at the same time is generally 150 or less, 140 or less, 130 or less, 120 or less, 110 or less, 100 or less, 90 or less, 80 or less, 70 or less, 60 or less, 50 or less, 45 or less, 40 or less, 35 or less or even 30 or less; subscript e is the average number of $CH_2$ units in each linkage and has a value independently in each occurrence of zero or more, one or more, even two or more and at the same time is usually 4 or less, 3 or less or even 2 or less; subscript f typically has a value of zero or more, one or more, 2 or more, 3 or more and at the same time is generally 6 or less, 5 or less, 4 or less, 3 or less, or even 2 or less; and subscript g typically has a value of zero or more, one or more, 2 or more, 3 or more, even 4 or more while at the same time generally has a value of 6 or less, even 5 or less, 4 or less, or 3 or less.

Desirably, the monotrialkoxysiloxy-terminated diorganopolysiloxane has the general molecular structure (IV):

$$(CH_3)_3SiO—((CH_3)_2SiO)_t—Si(OR^2)_3 \quad (IV)$$

One particularly desirable trialkoxysiloxy-terminated diorganopolysiloxane has the composition of Formula (IV) with $R^2$ equal to a methyl and subscript t equal to a value of 130 or less, preferably 120 or less, preferably 110 or less, more preferably 110 or less 100 or less, 90 or less, 80 or less, 70 or less, 60 or less, 50 or less, 40 or less, or 30 or less while at the same time 20 more, preferably 30 or more so as to form a terminal trimethoxy functionalized silicon atom.

The concentration of monotrialkoxysiloxy-terminated diorganosiloxane is typically zero wt % or more, 0.10 wt % or more, 0.20 wt % or more, 0.30 wt % or more, 0.40 wt % or more, 0.50 wt % or more, 0.75 wt % or more, even 1.0 wt % or more or 2.0 wt % or more, while at the same time is generally 3.0 wt % or less, 2.0 wt % or less, 1.20 wt % or less, 1.15 wt % or less, or even 1.10 wt % or less based on composition weight.

The composition can further comprise (or be free of) any one or any combination of more than one additional component. Examples of such additional components include cure inhibitors, cure catalysts, crosslinkers, antioxidant stabilizers, pigments, viscosity modifiers, silica filler, and spacer additives. For avoidance of doubt, the composition can be free of any one or any combination or more than one of the additional components. For example, the composition can be free of silica filler. "Silica filler" refers to solid particulates that comprise silica including natural silica (such as crystalline quartz, ground quartz, and diatomaceous silica), and synthetic silica (such as fumed silica, fused silica, silica gel and precipitated silica). Additionally, or alternatively, the composition of the present invention can be free of polyether and/or silanol functional polydimethylsiloxane.

Examples of cure inhibitors include 1,3,5,7-tetravinyl-1,3,5,7-tetramethylcylcotetrasiloxane, 1-ethynyl-1-cyclohexanol, 2phenyl-3-butyn-2-ol, 2-methyl-3-butyn-2-ol, fumarates, maleates, and methyl(tris(1,1-dimethyl-2-propynyloxy))silane. When present, inhibitors are typically present at a concentration of 0.0001 wt % or more wt % or more and at the same time is generally present at a concentration of 5 wt % or less, or even one wt % or less, even 0.5 wt % or less based on composition weight.

Cure catalysts can include, for example, hydrosilylation cure catalysts such as platinum based catalyst such as Karstedt's catalyst and/or Speier's catalyst ($H_2PtCl_6$).

Crosslinkers include siloxanes having two or more silyl hydride (SiH) functionalities on average per molecule, and include the third polyorganosiloxane mentioned herein above.

Antioxidant, if present, can be included typically at a concentration of 0.001 to one wt % of the composition weight. Antioxidants can be present alone or in combination with stabilizers. Antioxidants include phenolic antioxidants and stabilizers include organophosphorous derivatives.

Examples of pigments include carbon black, graphite, titanium dioxide, and copper phthalocyanine. When present, pigment tends to be present at a concentration of 0.0001 to one wt % based on composition weight.

Spacer additives are non-thermally conductive fillers and have average particle sizes in the range of 50-250 micrometers. Examples of spacers include glass and polymer beads.

The composition can be free of hydroxyl functional polysiloxanes and hydroxyl functional hydrocarbons.

Thermally Conductive Compositions

The composition of the present invention can be a thermally conductive composition. As a thermally conductive composition, the filler particles comprise thermally conductive filler particles and desirably at a concentration of 40 vol % or more, and can be 50 vol % or more, 60 vol % or more even 70 vol % or more and at the same time generally are present at a concentration of 80 vol % or less and can be 70 vol % or less, 60 vol % or less, or even 50 vol % or less based on composition volume.

When the thermally conductive filler is present at a concentration in a range of 40 to 70 vol % based on composition volume, then the first polyorganosiloxane is desirably present at a concentration sufficient to provide a concentration of succinic anhydride groups in a range of 7.5 to 200 micromoles per gram of matrix material.

When the thermally conductive filler is present at a concentration in a range of more than 70 up to 80 vol % based on composition volume, then the first polyorganosiloxane is desirably present at a concentration sufficient to provide a concentration of succinic anhydride groups in a range of 0.3 to 120 micromoles per gram of matrix material.

The thermally conductive composition desirably comprises a filler treating agent as described previously.

One desirable second polyorganosiloxane for use in thermally conductive compositions of the present invention is a polydimethylsiloxane with terminal vinyl functionality and an average degree of polymerization in a range of 40 to 800 (that is, chemical structure (II) where each R is methyl, each $R^a$ is vinyl and m is in a range of 40 to 800).

Electrically Conductive Compositions

The composition of the present invention can be an electrically conductive composition. As an electrically conductive composition, the filler particles comprise electrically conductive filler particles and desirably at a concentration of 15 vol % or more, and can be 20 vol % or more, 30 vol % or more, 40 vol % or more, and even 50 vol % or more and at the same time are typically present at a concentration of 60 vol % or less and can be 50 vol % or less, 40 vol % or less, 30 vol % or less, or even 20 vol % or less based on composition volume.

When the composition is an electrically conductive composition, the first polyorganosiloxane is desirably present at a concentration sufficient to provide succinic anhydride groups at a concentration in a range of 7 to 160 micromoles per gram of vinyl functional polyorganosiloxane. It is also desirable for the second polyorganosiloxane to be a polydimethylsiloxane with terminal vinyl functionality and an average degree of polymerization in a range of 140 to 800 (that is, chemical structure (II) where each R is methyl, each $R^a$ is vinyl and m is in a range of 140 to 800).

EXAMPLES

Table 1 identifies materials for use in preparing samples described herein.

TABLE 1

| Component | Description | Source |
|---|---|---|
| First Polyorganosiloxane 1 | Succinic anhydride-terminated polydimethylsiloxane having Structure (I) where R' is $-(CH_2)_3-$, each R is methyl and average n is 7, with a zero shear viscosity of 75-100 mPa*s at 25° C. | Available as DMS-Z21 from Gelest. |
| First Polyorganosiloxane 2 | Succinic anhydride-terminated polydimethylsiloxane having Structure (I) where R' is $-(CH_2)_3-$, each R is methyl and average n is 100. | Prepared as described herein below. |
| Second Polyorganosiloxane 1 | Vinyl dimethyl terminated polydimethylsiloxane having chemical structure (II) where each $R^a$ is vinyl, each R is methyl and m is 40. | Prepare according to teachings in U.S. Pat. No. 4,329,273. |
| Second Polyorganosiloxane 2 | Vinyl dimethyl terminated polydimethylsiloxane having chemical structure (II) where each $R^a$ is vinyl, each R is methyl and m is 180, and a zero shear viscosity of 430 mPa*s at 25° C. | Prepare according to teachings in U.S. Pat. No. 4,329,273. |
| Second Polyorganosiloxane 3 | Vinyl dimethyl terminated polydimethylsiloxane having chemical structure (II) where each $R^a$ is vinyl, each R is methyl and m is 800, viscosity of 44,000 mPa*s and 0.088 wt % vinyl. | Prepare according to teachings in U.S. Pat. No. 4,329,273. |
| Second Polyorganosiloxane 4 | Vinyl dimethyl terminated polydimethylsiloxane having chemical structure (II) where each $R^a$ is vinyl, each R is methyl and m is 50. | Prepared according to teachings in U.S. Pat. No. 4,329,273. |
| Second Polyorganosiloxane 5 | Vinyl dimethyl terminated polydimethylsiloxane having chemical structure (II) where each $R^a$ is vinyl, each R is methyl and m is 150. | Prepared according to teachings in U.S. Pat. No. 4,329,273. |

TABLE 1-continued

| Component | Description | Source |
|---|---|---|
| Filler 1 | Aluminum trihydrate particles having an average size of 45 μm. | Available as MX-200 from RJ Marshall company. |
| Filler 2 | Crushed alumina particles having an average size of 3 μm. | Available as A-CF-3 from Chalco company. |
| Filler 3 | Zinc oxide particles having an average size of 0.12 μm. | Available as ZOCO102 from Zochem company. |
| Filler 4 | Spherical alumina particles having an average size of 40 μm. | Available as DAM-40K from Denka company. |
| Filler 5 | Zinc oxide particles having an average size of 0.2 μm. | Available as ZOCO104 from Zochem company. |
| Filler 6 | Silver flake having an average size of 3.94 μm. | Available as RA-0127 from Metalor Technologies. |
| Filler Treating Agent 1 | n-decyltrimethoxysiloxane | Available as SID2670.0 from Gelest. |
| Filler Treating Agent 2 | $(CH_3)Si[(CH_3)_2SiO]_{110}Si(OCH_3)_3$ | Prepare according to teaching in US2006/01300336. |
| Si—H Polysiloxane | Trimethyl terminated dimethyl-cohydrogen methyl polysiloxane with 0.83 wt % SiH. | Available as HMS-501 from Gelest. |
| Platinum Catalyst 1 | 1,3-diethenyl-1,1,3,3 tetramethyldisiloxane platinum complex (Karstedt's catalyst) siluted in Second Organopolysiloxane 2 to contain 5000 parts per million by weight of platinum. | Prepare by diluting 17 weight-parts Gelest SIP6830.3 in 83 weight-parts Second Organopolysiloxane2. |
| Inhibitor 1 | 1,3,5,7-tetravinyl-1,3,5,7-tetramethylcyclotetrasiloxane | Available as SIT7900.0 from Gelest. |

Synthesis of First Polyorganosiloxane 2

Place 480.38 g of a di-Methyl hydrogen-terminated polydimethylsiloxane with an average of DP as 100 (prepared by teaching in U.S. Pat. No. 2,823,218 to Speier, et al.; and U.S. Pat. Nos. 4,329,273, 2,823,218 to Speier, et al.), 19.61 g of Allylsuccinic anhydride (CAS: 7539-12-0, purchased from Sigma-Aldrich), and 55.56 g of isododecane (CAS: 31807-55-3, purchased from Sigma-Aldrich) to a 1000 ml three neck round bottom flask equipped with glass stir rod, glass stir rod adapter, condenser, temperature probe, nitrogen purge, and heating mantle. Turn the stirring on to 250 rpm and heat the contents of the reaction flask to 75° C. and add 0.35 g of a 1% SYL-OFF™ 4000 Catalyst (obtained from The Dow Chemical Company) in Isododecane solution. After the exotherm of 15° C. let the reaction hold for one hour and then check Si—H by FTIR. Once the Si—H is not observable by FTIR, set up the reaction for a devolatization step. Add vacuum distillation glassware and devolatilize the contents of the flask at 135° C. and vacuum approximately 5 mm Hg for two hours. After two hours cool to room temperature, release vacuum, and decant to give First Organopolysiloxane 2.

Thermally Conductive Composite Samples—Part I

Prepare samples by first preparing a thermally conductive composite and then mixing the conductive composite with a First Polyorganosiloxane component. Prepare five thermally conductive composites (TC-1 through TC-5) according to the formulations in Table 2 and the following procedure: add the Second Polyorganosiloxane 1, Filler Treating Agents and Filler 3 to a 100 milliliter (mL) polypropylene cup and place the cup in a Flacktek Speedmixer and mix at 2000 revolutions per minute (RPM) for 20 seconds. Then add Filler 2 and mix again at 2000 RPM for 30 seconds, followed by adding Filler 1 and mixing at 2000 RPM for 30 seconds. Transfer the resulting mixture to an aluminum pan and heat to 150 degrees Celsius (° C.) under vacuum at 3.066 MegaPascal (23 Torr) pressure for one hour.

TABLE 2

| Formulation | Second Polyorganosiloxane 1 (grams) | Filler Treating Agent 1 (grams) | Filler Treating Agent 2 (grams) | Filler 1 (g) | Filler 2 (g) | Filler 3 (g) | WT %2* | Final Filler Loading (vol %) |
|---|---|---|---|---|---|---|---|---|
| TC-1 | 6.27 | 0.50 | 1.20 | 45.89 | 26.50 | 19.64 | 7.97 | 78 |
| TC-2 | 8.04 | 0.50 | 1.20 | 45.00 | 26.00 | 19.26 | 9.74 | 74 |
| TC-3 | 9.94 | 0.50 | 1.20 | 44.06 | 25.45 | 18.85 | 11.64 | 70 |
| TC-4 | 15.30 | 0.50 | 1.20 | 41.39 | 23.90 | 17.71 | 17.0 | 60 |
| TC-5 | 29.85 | 0.50 | 1.20 | 34.13 | 19.71 | 14.61 | 31.55 | 40 |

*WT %2 is the weight-percent of matrix material in the composition.

Prepare thermally conductive composites in 20 mL polypropylene cups by adding 20 grams (g) of thermally conductive composite and then the specific amount First Polyorganosiloxane component to act as a thixotropic agent by adding 0.02 g of First Polyorganosiloxane for every 0.1 wt % in the formulation (for loadings with 0.1 wt % use 0.02 g First Polyorganosiloxane; for loadings with 0.5 wt % use 0.10 g First Polyorganosiloxane; etc.).

Place the polypropylene cup into a Flacktek speedmixer and mix at 1500 RPM for 20 seconds to obtain the sample thermally conductive composite. Formulations for the thermally conductive composite samples are in Table 3 along with characteristics of the thermally conducive composites. Table 3 is grouped by vol % filler in the composition.

TABLE 3

| Sample | TC used | Vol % Filler | 1st Polyorganosiloxane Which one | WT %1* | [Succinic Anhydride Group] (micromoles/g matrix material) | Maximum Viscosity (Pa*s) | Minimum Viscosity (Pa*s) | Thixotropic Index | Comments |
|---|---|---|---|---|---|---|---|---|---|
| Ref 1 | TC-1 | 78 | (none) | N/A | 0 | 1174 | 43 | 27 | Reference |
| 1 | TC-1 | 78 | 1 | 0.1 | 26.9 | 10296 | 116 | 89 | Pass[1] |
| A | TC-1 | 78 | 1 | 0.5 | 134.6 | 50906 | 431 | 118 | Fail[2] |
| Ref 2 | TC-2 | 74 | (none) | N/A | 0 | 449 | 19 | 24 | Reference |
| 2 | TC-2 | 74 | 1 | 0.01 | 2.2 | 1193 | 27 | 44 | Pass[1] |
| 3 | TC-2 | 74 | 1 | 0.1 | 22.0 | 4421 | 55 | 80 | Pass[1] |
| 4 | TC-2 | 74 | 1 | 0.5 | 110.2 | 6475 | 109 | 59 | Pass[1] |
| 5 | TC-2 | 74 | 2 | 0.01 | 0.3 | 1055 | 30 | 35 | Pass[1] |
| 6 | TC-2 | 74 | 2 | 0.1 | 2.6 | 1077 | 39 | 27 | Pass[1] |
| 7 | TC-2 | 74 | 2 | 0.5 | 26.2 | 2369 | 66 | 36 | Pass[1] |
| Ref 3 | TC-3 | 70 | (none) | N/A | 0 | 461 | 14 | 33 | Reference |
| 8 | TC-3 | 70 | 1 | 0.1 | 18 | 2476 | 30 | 83 | Pass[1] |
| 9 | TC-3 | 70 | 1 | 1.0 | 184.4 | 6596 | 47 | 140 | Pass[1] |
| B | TC-3 | 70 | 2 | 0.1 | 2.2 | 493 | 21 | 23 | Fail[3] |
| 10 | TC-3 | 70 | 2 | 0.5 | 11.0 | 2118 | 35 | 61 | Pass[1] |
| Ref 4 | TC-4 | 60 | (none) | N/A | 0 | 126 | 4.5 | 28 | Reference |
| 11 | TC-4 | 60 | 1 | 0.1 | 12.6 | 294 | 8.4 | 35 | Pass[1] |
| 12 | TC-4 | 60 | 1 | 0.5 | 63.1 | 779 | 20 | 39 | Pass[1] |
| C | TC-4 | 60 | 2 | 0.1 | 1.5 | 137 | 6.6 | 21 | Fail[3] |
| D | TC-4 | 60 | 2 | 0.5 | 7.5 | 140 | 13 | 11 | Fail[3] |
| Ref 5 | TC-5 | 40 | (none) | N/A | 0 | 5.39 | 0.38 | 14 | Reference |
| E | TC-5 | 40 | 1 | 0.5 | 34.0 | 21.72 | 1.76 | 12 | Fail[3] |
| F | TC-5 | 40 | 2 | 0.5 | 4.1 | 13.31 | 1.61 | 8 | Fail[3] |

[1]Sample Passes if Minimum Viscosity is below 200 Pa*s, the Thixotropic Index increases, and the Max Viscosity increases to a greater extent than Minimum Viscosity relative to the corresponding Reference composite.

[2]Sample Failed because Minimum Viscosity exceeds maximum amount of 200 Pa*s.

[3]Sample Failed because Minimum Viscosity increased to a greater extent than Maximum Viscosity relative to Reference composite.

*WT %1 is the weight percent of 1st Polyorganosiloxane in the composition.

Thermally Conductive Composite Samples—Part II

Prepare Ref 6 by mixing together 12.24 g Second Polyorganosiloxane 2, 1.9 g Second Polyorganosiloxane 3, 0.47 g Filler Treating Agent 1, 62.88 g Filler 1 and 22.51 g Filler 3 in a polypropylene cup at 2500 RPM for 20 seconds in a Flacktek speedmixer. Heat the mixture at 150° C. under vacuum at 3.066 MegaPascal (23 Torr) pressure for one hour to obtain Ref 6. The weight-percent of matrix material in the composition (WT %2) is 14.61%.

Prepare Sample 13 by combining 20 g of Ref 6 with 0.02 g of First Polyorganosiloxane 1. Sample 13 contains 0.1 wt % First Polyorganosiloxane 1 and 14.7 micromoles of succinic anhydride groups per gram of matrix material.

Determine the Maximum and Minimum Viscosity and Thixotropic Index for Ref 6 and Samples 13. Results are in Table 4.

TABLE 4

| Sample | Succinic Anhydride Group Concentration (micromoles/g matrix material) | Wt % of 1st Polyorganosiloxane (WT %1) | Maximum Viscosity (Pa*s) | Minimum Viscosity (Pa*s) | Thixotropic Index | Comments |
|---|---|---|---|---|---|---|
| Ref 6 | 0 | 0 | 17492 | 119 | 147 | Reference |
| 13 | 14.7 | 0.1 | 65601 | 119 | 551 | Pass[1] |

[1]Sample Passes if Minimum Viscosity is below 200 Pa*s, the Thixotropic Index increases, and the Max Viscosity increases to a greater extent than Minimum Viscosity relative to the corresponding Reference composite.

Thermally Conductive Composite Samples—Part III

Prepare Ref 7 in a 1-gallon Baker Perkins sigma-blade mixer. Add 413.58 g Second Polyorganosiloxane 4, 20.00 g Filler Treating Agent 1, 20.00 g Filler Treating Agent 2, and 614.5 g Filler 5 and mix for 5 minutes. Scrape the chamber walls with a spatula and add 1310.5 g of Filler 2 and mix for 5 minutes. Scrape the chamber walls with a spatula and add 2621.0 g of Filler 4 and mix for 5 minutes. Scrape the chamber walls and then mix for an additional 5 minutes. Apply a vacuum to 25 Torr and mix for 30 minutes. Heat to 135° C. and mix for 60 minutes and then allow to cool to obtain Ref 7. The concentration of matrix material (WT %2) is 9.07 wt % relative to the composition weight.

Prepare Sample 14 by adding 100 g of Ref 7 to a Flacktek 100Max polypropylene cup and then adding 0.05 g of First Polyorganosiloxane 1. Mix at 2500 RPM for 20 seconds in a Flacktek speedmixer followed by 10 seconds at 1000 RPM.

Prepare Sample 15 by adding 100 g of Ref 7 to a Flacktek 100Max polypropylene cup and then adding 0.10 g of First Polyorganosiloxane 1. Mix at 2500 RPM for 20 seconds in a Flacktek speedmixer followed by 10 seconds at 1000 RPM.

Determine the Maximum and Minimum Viscosity and Thixotropic Index for Ref 7 and Samples 14 and 15. Results are in Table 5.

TABLE 5

| Sample | Succinic Anhydride Group Concentration (micromoles/g matrix material) | Wt % of $1^{st}$ Polyorgano siloxane (WT %1) | Maximum Viscosity (Pa*s) | Minimum Viscosity (Pa*s) | Thixotropic Index | Comments |
|---|---|---|---|---|---|---|
| Ref 7 | 0 | 0 | 2629 | 18 | 146 | Reference |
| 14 | 11.8 | 0.05 | 16060 | 44 | 365 | Pass[1] |
| 15 | 23.6 | 0.1 | 27124 | 79 | 343 | Pass[1] |

[1]Sample Passes if Minimum Viscosity is below 200 Pa*s, the Thixotropic Index increases, and the Max Viscosity increases to a greater extent than Minimum Viscosity relative to the corresponding Reference composite.

Curable Electrically Conductive Composite Samples

Table 6 presents the formulations for curable electrically conductive composite samples. Prepare the samples in the following manner.

First prepare a catalyst/inhibitor solution by adding the platinum catalyst component with the Second Polyorganosiloxane 2 component in a polypropylene cup and mixing at 2000 RPM for 30 seconds. Add the inhibitor component and mix at 2000 RPM for 30 seconds.

Then, prepare a masterbatch by adding the other Second Polyorganosiloxane component to a polypropylene cup and then add the catalyst/inhibitor solution. Mix at 2000 RPM for 30 seconds. Add the Si—H Polysiloxane component and mix at 2000 RPM for 30 seconds.

Weight out the specified amount of Filler component into a polypropylene cup, add the masterbatch and mix at 2000 RPM for 30 seconds. Add the specified amount of First Polyorganosiloxane 1 component and mix at 2000 RPM for 30 seconds to obtain the final curable electrically conductive composite sample.

TABLE 6

| Sample | Platinum Catalyst 1 | Second Polyorganosiloxane 2 | Inhibitor 1 | Additional Second Polyorganosiloxane | | Si—H Polysiloxane | Filler 6 | Wt % Matrix Material in Composition | First Polyorganosiloxane 1 | |
|---|---|---|---|---|---|---|---|---|---|---|
| | (g) | (g) | (g) | Which one | (g) | (g) | (g) | (WT %2) | (g) | (WT %1) |
| Ref 8 | 0.038 | 0.06 | 0.10 | 3 | 3.72 | 0.08 | 16 | 20 | 0 | 0 |
| 16 | 0.038 | 0.06 | 0.10 | 3 | 3.70 | 0.08 | 16 | 20 | 0.02 | 0.10 |
| 17 | 0.038 | 0.06 | 0.10 | 3 | 3.62 | 0.08 | 16 | 20 | 0.10 | 0.50 |
| 18 | 0.038 | 0.06 | 0.10 | 3 | 3.53 | 0.08 | 16 | 20 | 0.20 | 1.00 |
| 19 | 0.038 | 0.06 | 0.10 | 3 | 3.44 | 0.08 | 16 | 20 | 0.30 | 1.50 |
| Ref 9 | 0.058 | 0.09 | 0.16 | 3 | 5.57 | 0.12 | 14 | 30 | 0 | 0 |
| 20 | 0.058 | 0.09 | 0.16 | 3 | 5.56 | 0.12 | 14 | 30 | 0.02 | 0.10 |
| 21 | 0.058 | 0.09 | 0.16 | 3 | 5.48 | 0.12 | 14 | 30 | 0.10 | 0.50 |
| 22 | 0.058 | 0.09 | 0.16 | 3 | 5.39 | 0.12 | 14 | 30 | 0.20 | 1.00 |
| 23 | 0.058 | 0.09 | 0.16 | 3 | 5.30 | 0.12 | 14 | 30 | 0.30 | 1.50 |
| Ref 10 | 0.038 | 0.06 | 0.10 | 5 | 3.69 | 0.10 | 16 | 20 | 0 | 0 |
| 24 | 0.038 | 0.06 | 0.10 | 5 | 3.49 | 0.10 | 16 | 20 | 0.20 | 1.00 |
| Ref 11 | 0.038 | 0.06 | 0.10 | 4 | 3.52 | 0.26 | 16 | 20 | 0 | 0 |
| H | 0.038 | 0.06 | 0.10 | 4 | 3.33 | 0.26 | 16 | 20 | 0.20 | 1.00 |

Determine the Maximum and Minimum Viscosity and Thixotropic Index for Refs 8-11, Samples 16-24 and Sample H. Results are in Table 7.

TABLE 7

| Sample | [Succinic Anhydride Group] (micromoles/g matrix material) | Maximum Viscosity (Pa*s) | Minimum Viscosity (Pa*s) | Thixotropic Index | Comments |
|---|---|---|---|---|---|
| Ref 8 | 0 | 4372 | 98 | 45 | Reference |
| 16 | 10.7 | 5319 | 98 | 54 | Pass[1] |
| 17 | 53.6 | 11461 | 116 | 99 | Pass[1] |

TABLE 7-continued

| Sample | [Succinic Anhydride Group] (micromoles/g matrix material) | Maximum Viscosity (Pa*s) | Minimum Viscosity (Pa*s) | Thixotropic Index | Comments |
|---|---|---|---|---|---|
| 18 | 107.3 | 24458 | 126 | 194 | Pass[1] |
| 19 | 160.9 | 35058 | 138 | 254 | Pass[1] |
| Ref 9 | 0 | 428 | 86 | 5.0 | Reference |
| 20 | 7.1 | 467 | 84 | 5.6 | Pass |
| 21 | 35.8 | 1869 | 90 | 21 | Pass[1] |
| 22 | 71.5 | 3035 | 94 | 32 | Pass[1] |
| 23 | 107.3 | 5701 | 97 | 59 | Pass[1] |
| Ref 10 | 0 | 8954 | 14 | 640 | Reference |
| 24 | 107.3 | 20455 | 27 | 758 | Pass |
| Ref 11 | 0 | 6916 | 3.8 | 1820 | Reference |
| H | 107.3 | 18238 | 12 | 1519 | Fail[2] |

[1]Sample Passes if Minimum Viscosity is below 200 Pa*s, the Thixotropic Index increases, and the Max Viscosity increases to a greater extent than Minimum Viscosity relative to the corresponding Reference composite.
[2]Sample Failed because thixotropic index went down relative to reference.

What is claimed is:

1. A composition comprising filler particles dispersed in a matrix material, wherein the matrix material comprises:

a. a first polyorganosiloxane that comprises an average of 2 or more succinic anhydride groups per molecule; and b. a second polyorganosiloxane other than the first polyorganosiloxane;

wherein the filler particles are present at a concentration in a range of 15 to 80 volume-percent based on composition volume and wherein the first polyorganosiloxane is present at a concentration sufficient to provide succinic anhydride groups at a concentration of 0.30 to 200 micromoles per gram of matrix material; wherein the first polyorganosiloxane has the following average chemical structure:

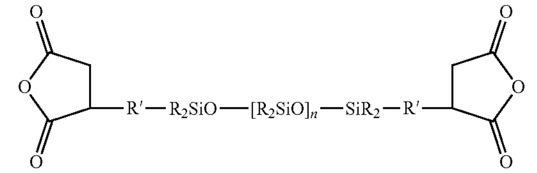

where R' is independently in each occurrence selected from a group of divalent hydrocarbons having from one to six carbon atoms, R is independently in each occurrence selected from a group of hydrocarbyls having from one to eight carbon atoms, and n is a value in a range of 5-150.

2. The composition of claim 1, where each R' is $-CH_2CH_2CH_2-$ and each R is methyl.

3. The composition of claim 1, wherein the second polyorganosiloxane is a vinyl functional polyorganosiloxane.

4. The composition of claim 3, wherein the matrix material further comprises a third polysiloxane comprising two or more silyl hydride groups.

5. The composition of claim 1, wherein the filler particles comprise thermally conductive filler particles at a concentration in a range of 40 to 80 volume-percent based on composition volume.

6. The composition of claim 5, wherein:

i. when the thermally conductive filler is present at a concentration in a range of 40 to 70 volume-percent based on composition volume then the first polyorganosiloxane is present at a concentration sufficient to provide concentration of succinic anhydride groups in a range of 7.5 to 200 micromoles per gram of matrix material; and ii. when the thermally conductive filler is present at a concentration of greater than 70 and at the same time 80 or less volume-percent based on composition volume, then the first polyorganosiloxane is present at a concentration sufficient to provide a concentration of succinic anhydride groups in a range of 0.3 to 120 micromoles per gram of matrix material.

7. The composition of claim 5, wherein the further comprises a filler treating agent.

8. The composition of claim 1, wherein the filler particles comprise electrically conductive filler particles that are present at a concentration in a range of 15 to 60 volume-percent based on composition volume.

9. The composition of claim 8, wherein the second polyorganosiloxane is a vinyl functional polyorganosiloxane and wherein the first polyorganosiloxane is present at a concentration sufficient to provide succinic anhydride groups at a concentration in a range of 7 to 160 micromoles per gram of vinyl functional polyorganosiloxane.

* * * * *